(12) United States Patent
Simmons et al.

(10) Patent No.: US 10,467,686 B2
(45) Date of Patent: Nov. 5, 2019

(54) INTEGRATED AUCTIONING ENVIRONMENT PLATFORM

(71) Applicant: XCIRA, INC., Tampa, FL (US)

(72) Inventors: James A Simmons, Brandon, FL (US); Nancy J Rabenold, Brandon, FL (US)

(73) Assignee: XCIRA, INC., Tampa, FL (US)

( * ) Notice: Subject to any disclaimer, the term of this patent is extended or adjusted under 35 U.S.C. 154(b) by 811 days.

(21) Appl. No.: 14/594,149

(22) Filed: Jan. 11, 2015

(65) Prior Publication Data

US 2016/0203548 A1 Jul. 14, 2016

(51) Int. Cl.
- *G06Q 30/08* (2012.01)
- *G06Q 30/06* (2012.01)
- *G06F 16/80* (2019.01)

(52) U.S. Cl.
CPC ............. *G06Q 30/08* (2013.01); *G06F 16/80* (2019.01); *G06Q 30/06* (2013.01); *G06Q 30/0625* (2013.01)

(58) Field of Classification Search
None
See application file for complete search history.

(56) References Cited

U.S. PATENT DOCUMENTS

| | | | | |
|---|---|---|---|---|
| 2002/0120552 A1* | 8/2002 | Grey | ...................... | G06Q 30/08 705/37 |
| 2003/0093326 A1* | 5/2003 | Poon | ...................... | G06Q 30/08 705/26.3 |
| 2004/0267561 A1* | 12/2004 | Meshkin | ................ | G06Q 30/02 705/26.1 |
| 2014/0164164 A1* | 6/2014 | Rabenold | ............... | G06Q 30/08 705/26.3 |

OTHER PUBLICATIONS

Kang, J2EE Clustering, Part 1, Feb. 23, 2001, http://www.javaworld.com/article/2075019/jndi/j2ee-clustering--part-1.html?page=2, p. 2.*
McKendrick, Where New Database Technologies Fit into the Enterprise, http://dialog.proquest.com/professional/docview/1555387908?accountid=161862, Dated Aug. 23, 2014.*
Alex, Using Elasticsearch in E-Commerce, Part 1, https://qbox.io/blog/using-elasticsearch-in-e-commerce-part-1, Dated Oct. 23, 2014.*

* cited by examiner

*Primary Examiner* — Marissa Thein
*Assistant Examiner* — Maria S. P. Heath
(74) *Attorney, Agent, or Firm* — Smith Tempel Blaha LLC; Gregory Scott Smith

(57) ABSTRACT

An integration of components into a platform that enables the provision of a dynamically adjustable auctioning environment. The platform may include a data store, a search engine, an application interface and one or more network accessible applications. The data store operates to receive and maintain real-time data from one or more sources, such as participants in the auction as well as non-participating entities or systems that generally have relevant information. The search engine interfaces to the data store and is configured to receive requests, construct searching criteria, query the data store, receive query results and provide the query results to the one or more requesting elements. The data accumulated is accessible in real-time for altering the operating environment as well as providing data input to connected systems.

19 Claims, 6 Drawing Sheets

INTEGRATED AUCTIONING ENVIRONMENT PLATFORM

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b). This application incorporates the following documents by reference in their entireties:

U.S. application Ser. No. 13/706,831 filed on Dec. 6, 2012 and bearing the title of INTEREST GAUGE BASED AUCTION, U.S. application Ser. No. 14/093,643 filed on Dec. 2, 2013 and bearing the title of CONVERSION ENHANCED AUCTION ENVIRONMENT, U.S. application Ser. No. 11/680,941 filed on Mar. 1, 2007 and bearing the title of TRANSFERRING PRODUCTS TO VARIOUS PLATFORMS, U.S. application Ser. No. 11/672,988 filed on Feb. 9, 2007 and bearing the title of FLIPPING PRODUCTS BETWEEN PLATFORMS, U.S. Pat. No. 6,813,612 issued on Nov. 2, 2004 and bearing the title of REMOTE BIDDING SUPPLEMENT FOR TRADITIONAL LIVE AUCTIONS, U.S. Pat. No. 7,028,885 issued on Apr. 18, 2006 and bearing the title of AUTOMATED CONDITION EVALUATOR, U.S. Pat. No. 8,739,059 issued on May 27, 2014 and bearing the title of SYSTEM FOR GENERATING INSPECTION REPORTS FOR INSPECTED ITEMS and U.S. application Ser. No. 13/781,693 filed on Feb. 28, 2013 and bearing the title of INTEGRATION OF REMOTE BIDDERS INTO MULTIPLE AND SIMULTANEOUS LIVE AUCTIONS.

BACKGROUND

"Sold . . . to the man with the sideburns and the greasy black moustache . . . oh, excuse me, Madam!" This line is taken from the musical Seussical Jr. based on the works of Dr. Seuss. The line is recited during an auction in which Horton the elephant, shortly after hearing the voice of the Whos of Whoville, is poised at the top of a tree, having been snookered into sitting on Mayzie La Bird's egg, was offered up for sale. This line is illustrative of how the auctioning world has been intimately integrated into the routine of our ordinary life. Historians have found evidence to establish that auctions have existed in society at least back to 500 BC. Over the centuries, the style, objects and methodology of the auction have changed but today, the auctioning environment is still alive and growing.

Although not the first, EBAY has certainly been instrumental in bringing the auction world to the Internet platform allowing any individual to be engaged in an auction from the comfort of their home. However, another pioneer in the industry, XCIRA, INC., has also revolutionized the auctioning industry by not only including the Internet as an access means to an auction, but more importantly, integrating a live auction environment into an Internet auctioning environment enabling, among other things, the ability for remote bidders and sellers to actively participate in a live auction virtually along side of local on-site participant and with all the same advantages, excitement and intensity of actually attending the auction in person.

Certainly, connectivity has made our rather large planet seem as though "it's a small world after all". An individual can enter a single search in a web browser, pull up information related to the search query from all over the globe, place a telephone call or send an email to a company on the other side of the planet that was identified in the search results, and have a product shipped to his or her home with a confirmatory email sent to his computer all in a few sweeps and clicks of a mouse. Actions that used to take weeks worth of work can now be accomplished in just a few moments.

In addition, it was not that long ago that if an individual wanted to conduct research regarding a product purchase, the individual would go to the local library or their personal library, and search through the additions of CONSUMER REPORTS to try to find a description and comparison of comparable products, the pricing and reliability of those products, and use this information in an attempt to make an informed decision. Today, a vast array of information is available to a person through the use of the Internet to conduct such research more quickly and reliably. As a few examples, THE WIRECUTTER and THE SWEETHOME websites pool a wide range of sources for conducting product research. In addition, sites such as AMAZON, OVERSTOCK, etc. provide the ability for consumers to purchase directly from individuals or companies and take advantage of having access to used items, discounted items, discounts available through bulk purchasing and overstocking of inventory, etc.

In view of the radical advancements in worldwide connectivity through mediums such as the World Wide Web, cellular infrastructure, etc., there remains a need in the art for the logistical implementation and integration of capabilities as previously described, as well as other capabilities, into real-life scenarios. Often times, the lack of knowledge, understanding, and/or imagination can be a stumbling block for various business entities, market segments, and industries to fully comprehend and incorporate such technological advancements into their world and to fully reap the benefit of such advancements.

XCIRIA, INC. has been quite instrumental in pulling the auction industry into this "connected world" and along with the growth of the Internet and connectivity, XCIRA, INC. has brought radical modification to the auction industry. Through XCIRA's invoation, an industry that was at one time limited to the noise and bustle of the auctioning floor in an auction house with the yipping of the auctioneer has been opened up to participants that remain in their office, or at home, or at another auction house while bidding and following items in an auction house half-way across the country. This has been accomplished by bringing the auction houses online such that a person can watch items, hear the live bidding, yipping and calls of the auctioneer, and bid on items just as though he or she was standing in the lane.

Although great advancements have been made in the auctioning industry from the perspective of access and/or remote participation, little has been done to change the overall structure or operation of the auction process. More specifically, the great advancements in technology and connectivity that are available to help guide and run businesses in this age of connectivity and data warehousing have not been fully exploited to revolutionize the auction industry. As a result, much of the operation of auctions remains the same and auctions tend to be one-dimensionally focused. For example, in an auto auction, as each vehicle is brought into the lane, the auction house, the bidders, the auctioneer, etc., are all focused on that single car. The auctioneer is trying to find a buyer—he is scanning the audience and watching the bidders in an attempt to find an interest that can be leveraged to sell the current vehicle (i.e., obtain a conversion). The bidders are looking at the product and deciding if it would meet their particular needs for the particular moment, be it transportation, leasing, reselling, refurbishment, parts, etc. In addition, all participants share in the energy of the auction, the desire to have a "win", the competition and excitement of the moment.

The present disclosure focuses on further advancements in the integration of the auction industry into out connected world.

BRIEF SUMMARY

The present disclosure is focused on the presentment of embodiments of a next generation platform (NGP) that can be used in a variety of settings to provide an integrated system of multiple components and to enable them to seamlessly cooperate to provide instantaneous feedback to various elements within the integrated system, to enhance and/or improve the overall performance of the integrated system and to leverage the knowledge base available from a wide variety of systems. More specifically, the present disclosure presents embodiments of a platform for implementing an auctioning system that can access real-time data related to the operation of the auction, as well as information related to ancillary aspects of the auction, the participants and items for sale, and provide receive instantaneous feedback to components and entities engaged in the auction to optimize conversions. As a non-limiting example, the characteristics of the bidding progression of an auction, along with real-time events and identification of the auction participants can be analyzed to modify the parameters of an auction in an attempt to increase the winning bid level or create an incentive for bidding entities to be more aggressive.

One embodiment includes a system for providing a dynamically adjusting auctioning environment. This embodiment integrates a wide variety of network accessible components into a single platform. An exemplary platform may include a data store, a search engine, an application interface and one or more network accessible applications. In such embodiments, the data store operates to receive and maintain real-time data from one or more sources, such as participants in the auction as well as non-participating entities or systems that generally have relevant information. The search engine interfaces to the data store and is configured to receive requests from one or more requesting elements, construct searching criteria based on the request, query the data store based on the searching criteria, receive query results and provide the query results to the one or more requesting elements. The application interface provides access to the search engine and the data store and network accessible applications. One or more of the network accessible applications interface with one or more networked components. Further, the network application may provide a system function (such as an integrated auction as a non-limiting example), the operation of which is based at least in part on the query results from the search engine and the interfaced networked components. In addition, the network accessible applications may include an interface to one or more user devices for invoking and interacting with the system function associated with the networked application. In some embodiments, the networked applications may be stored, accessed, operated and/or executed on one or more of a plurality of J2EE Server Nodes and each of the J2EE server nodes may exist within a J2EE Server Cluster.

In addition, such embodiments may also include a load balancer that interfaces with the network accessible applications, the networked components and the user devices. In an exemplary embodiment, the load balancer may operate to receive a system function request for a particular network accessible application and identify which network accessible application instance to invoke based on the current load for the J2EE Server nodes.

More specifically, the previously-describe embodiment may include at least one, network accessible application that is an auction application. In such embodiment, the auction application may operate to analyze the received query results based on real-time data and instantaneously alter the operation of the auction. Further, the auction application may analyze the received query results based on real-time data and provide feedback to one or more of the plurality of networked components for altering the operation of one or more of the networked components.

In addition or in the alternative, the auction application may operate to receive experimental parameter adjustments and provide the parameter adjustments to one or more of the plurality of networked components for altering the operation of one or more of the networked components, receive real-time query results and analyze the real-time query results to determine the effect of the experimental parameter adjustments.

These various embodiments and variants thereof may implement the data store as a couchbase cluster. Further, such embodiment may implement the search engine as an elasticsearch cluster.

Another exemplary embodiment includes a process for dynamically altering the operation of an auctioning event. The process includes an auctioning module commencing an auctioning event based on a first set of operational parameters or characteristics. The first set of operational parameters would dictate the general characteristics, rules or operation of the auctioning event. Once the auctioning event has commenced, the auctioning module obtains real-time data regarding the operation and participation of the auctioning event and performs a real-time analysis of the real-time data. The real-time data can be obtained from a data store communicatively coupled to the auctioning module, and general the real-time data pertains to various aspects of the auctioning event, such as the participants, the bidding sequencing, the products of consideration, seller characteristics, data provided from other systems involved in the auctioning event or systems related to other aspects of the auctioning event such as social networking systems providing information about participants, business bureau information pertaining to the sellers, market and reliability information pertaining to the products, political and social-economic current events, etc. The auctioning module generates feedback and provides the feedback to one or more networked components communicatively coupled to the auctioning module. Generally, the feedback may include information to alter the operational parameters of the auctioning event.

More specifically, the process of generating feedback may further include generating feedback based at least in part on the real-time analysis of the real-time data. In addition or in the alternative, the process of generating feedback may involve generating feedback that can be used to experimentally alter the operational parameters of the auctioning event independent of the real-time analysis and further, monitoring the changes in the ongoing real-time analysis to identify the effect of the experimentally altered operational parameters.

In this exemplary embodiment, the auctioning module may be a network accessible application operating within a J2EE server cluster and, further operating to provide an auction interface to one or more participating devices; and deliver auctioning event update information through the auction interface to one or more participating devices.

It should be appreciated that each of the operations in this process may be performed in the listed order or other order or, may be run concurrently and continuously.

In the described embodiment, generating feedback may include applying a set of heuristics to generate feedback directed to increase the likelihood of a conversion. In addition or in the alternative, generating feedback may include creating feedback that is directed to result in an effect on the auctioning event and further comprising the action of analyzing the effects caused by the feedback. These embodiments as well as other features and aspects are more fully described in the detailed description.

DETAILED DESCRIPTION

The present disclosure is generally directed towards a platform that provides, among other things, an advancement and novel approach of integrating existing technology that has been deployed within an online auctioning system, such as those manufactured, deployed and managed by XCIRA, INC., with cutting edge technology. Such novel advancements further enhance the performance and usability of an auctioning environment that services onsite and/or online entities, including but not limited to bidders, sellers, consignors and third party entities.

In addition, the present disclosure describes various embodiments of this integrated system, which will be generally referred to as the Next Generation Platform (NGP), as well as various features, aspects, functions, etc. of the various embodiment of the NGP. As non-limiting examples, the NGP is uniquely poised to provide flexibility, migration and up-to-date capabilities to the auctioning environment that can incorporate functionality to focus on the psychological aspects of the auctioning environment, interfaces to exploit already deployed systems, leveraging of large accumulations of data to optimize the auctioning environment as well as to broaden the footprint of parties or entities that can benefit from the knowledge base that is inherently generated and maintained through the auctioning environment.

Because technology and needs are constantly changing, the various embodiments of the NGP present a flexible, customizable and scalable solution to accommodate the changes in technology and the changes in the needs of the asset disposition space. The asset disposition space can incorporate a wide variety of entities including sellers, buyers, bidders, third-party service providers, ancillary markets, etc.

Further, because some environmental changes in the asset disposition space can occur rapidly and unexpectedly, the various embodiments of the NGP are advantageously readily adaptable so as to enable the creation and deployment of enterprise level products in a quick, timely manner to avoid a long development cycle that may entirely miss or at least squelch the adaptation of an auctioning environment to the required changes. As such, the various embodiments of the NGP focus on the ease of integration with the systems and operations of the various entities in the asset disposition space. And as required in commercial applications in which entities have a significant reliance on the underlying technological infrastructure, the various embodiments of the NGP present reliable, stable and trusted solutions.

The various embodiments of the NGP can be viewed as providing a comprehensive solution for an auctioning environment that provides content management, asset management, bidding engines and data warehousing.

Figure 1:
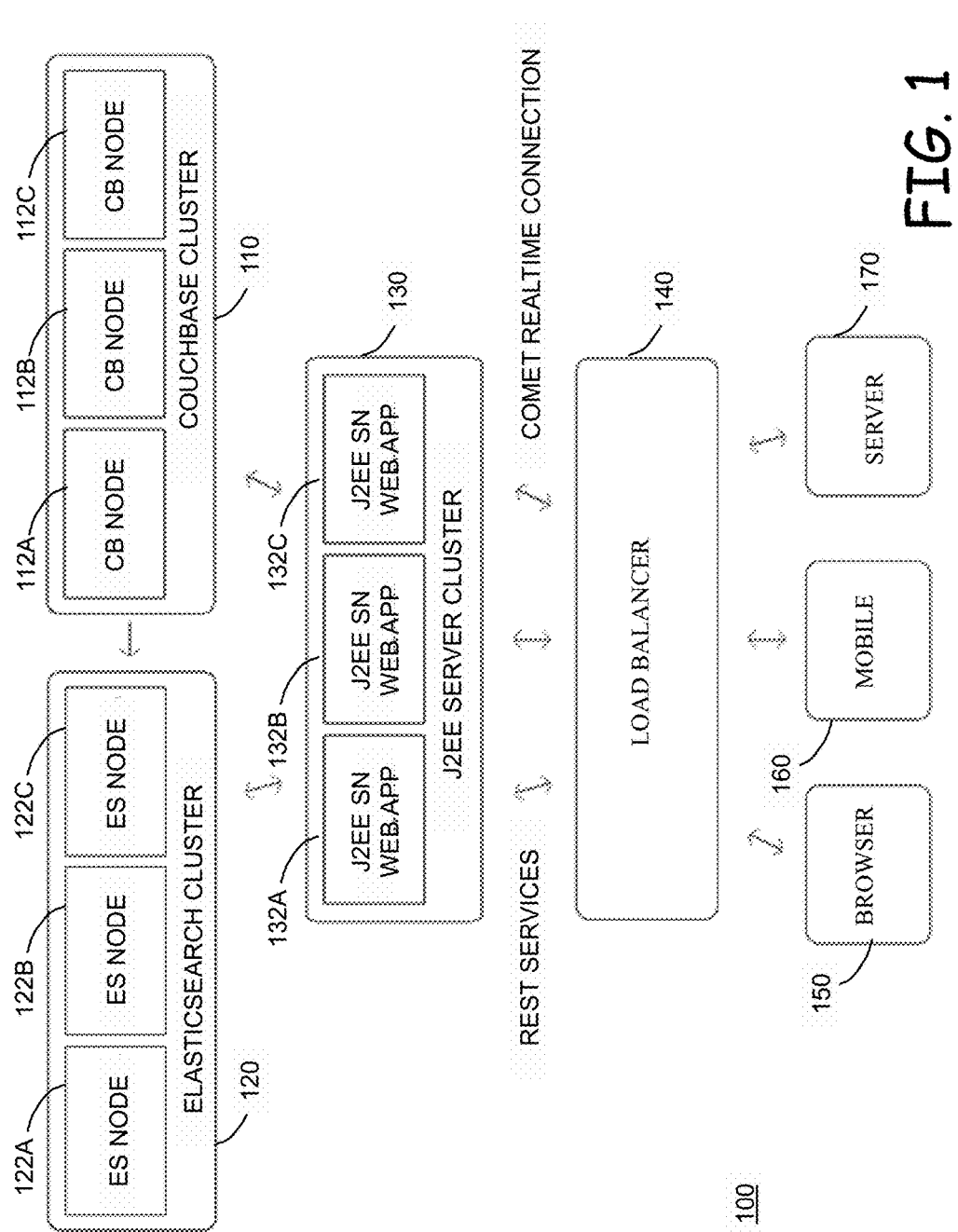
FIG. 1 is a system block diagram illustrating exemplary components or elements that may be included in various embodiments of the NGP.

FIG. 1 is a system block diagram illustrating exemplary components, functions, systems, elements, etc., (collectively components) that may be included in various embodiments of the NGP. The various embodiments of the NGP are not limited to illustrated configuration and, it should be appreciated that all of the illustrated components are not necessarily required in all embodiments of the NGP. Further, the components delineated in the system block diagram are provided for the purpose of describing the overall functionality or capabilities of an exemplary NGP and as such, the various boxes, interfaces, etc., may not actually represent the physical structure of the exemplary NGP as, in the various embodiments, the components or elements may be combined, shared, further bifurcated, etc.

The illustrated NGP 100 is shown as including a couchbase dB or couchbase cluster 110, an elasticsearch cluster 120, a J2EE server cluster 130 and a load balancer 140. In addition, various non-limiting examples of classes of entities are shown interfacing to the illustrated NGB including, a browser 150, a mobile device 160 and a server 170. Traditionally, systems utilized in applications comparable to an enterprise auctioning environment scale have incorporated SQL based databases. These traditional SQL databases are cumbersome, difficult to modify and manage, and require a high-leveled skilled engineer intimately familiar with the SQL programming language to make modifications or adjustments or simply to maintain the system. The illustrated NGP employs a couch database, which enables the use of JSON documents. The JSON documents can readily be retrieved using keys.

The couchbase cluster 110 is illustrated as including a plurality of nodes, couchbase nodes or simply CB nodes 112A, 112B and 112C as a non-limiting example of a three-node cluster. Those of ordinary skill in the relevant art will be familiar with the functionality and the benefits of a couchbase dB, which typically includes a couchbase cluster manager and data manager. The cluster manager supervises the configuration and behavior of all the servers in a couchbase cluster. It configures and supervises internode behavior like managing replication streams and rebalancing operations. It also provides metric aggregation and consensus functions for the cluster, and a restful cluster management API. The cluster manager may be built on top of Erlang/OT—a proven environment for building and operating fault-tolerant distributed systems. The data manager is responsible for storing and retrieving documents in response to data operations from applications. As such, the couchbase cluster 110 operates as the main data store for various embodiments of the NGP. For example, such embodiments can eliminate the reliance on SQL type databases. In such embodiments, the data is stored within JSON documents, which can be retrieved by utilizing keys. The data is distributed across the various couchbase nodes (i.e. 112A-112C) of the couchbase cluster 110 and the couchbase nodes may operate to replicate data. The data within the couchbase cluster 110 can be streamed to another cluster or data center.

One advantage of this configuration is that the NGP can allow a wide variety of devices or systems to interface to the NGP and provide additional data for the couchbase database and to leverage the benefit of the data available.

The illustrated NGP also shows the use of an elasticsearch cluster 120. Those of ordinary skill in the relevant art will be familiar with the functionality and benefits of an elasticsearch cluster. Elasticsearch is a flexible and powerful open source, distributed, real-time search and analytics engine. The elasticsearch was built from the ground up for use in distributed environments where reliability and scalability are of significant importance. Thus, the elasticsearch cluster 120 enables comprehensive searches well beyond simple full-text search. The elasticsearch cluster 120 includes a robust set of APIs and query DSLs, as well as clients that support a variety of programming languages. The illustrated elasticsearch is shown as including three elasticsearch nodes 122A, 122B and 122C, however, any number of nodes may be added to further expand the capabilities and performance of the elasticsearch cluster 120. The elasticsearch cluster 120 operates as an index into the couchbase dB. The data stored within the couchbase cluster 110 is streamed to the elasticsearch cluster 120 for enhanced searching capabilities. To increase the speed of searching and retrieving data within the couchbase cluster 110, indexes are distributed across the cluster. As data is updated, modified or changed in the couchbase nodes, the cluster is rebalanced and the data is stored in buckets as key-value pairs. The indexing of the data by the couchbase cluster tracks the data modifications such that it is typically less than 1 second in lag time.

The illustrated NGP includes a J2EE server cluster 130 that interfaces to the elasticsearch cluster 120 and the couchbase cluster 110, as well as a load balancer 140. The J2EE or Java 2 Enterprise Edition is particularly suitable for mission-critical and large-scale applications. Such applications may include banking environments, which necessitate a high-level of availability, or applications such as GOOGLE for more scalability. The mission criticality and importance of high availability and scalability in today's increasingly inter-connected world can be illustrated by a well known incident: a 22-hour service outage of eBay in June 1999, caused an interruption of around 2.3 million auctions, and made a 9.2 percent drop in eBay's stock value. Thus, J2EE clustering is a popular technology to provide high available and scalable services with fault tolerance.

In the illustrated NGP 100, one or more web applications are stored in each J2EE SN WEBAPP node instance 132A-C. This architecture is possible because the web applications are stateless, storing all states in the couchbase cluster 110. The web applications support REST endpoints and COMET end points. This advantageously allows for data requests through AJAX or long polling for real-time updates.

The load balancer 140 sits between the J2EE Server Cluster 130 and the various access devices/systems or interface/devices, such as browser 150, mobile device 160 and server 170. The load balancer may operate to determine which J2EE servers are experiencing or are expected to be experiencing low load level instances. This information may then be utilized by the load balancer 140 in determining which server in the J2EE server cluster 130 to which to send a request. Further, the load balancer 140 may also include the capabilities to determine when one or more J2EE servers are down and then to refrain from sending requests to those instances until a status change is detected.

A variety of interfaces/devices can be supported by an exemplary NGP 100, such as browser 150, mobile device 160 and/or server 170. In the illustrated embodiment, the devices utilize REST services and COMET endpoints to communicate to the web applications. As a non-limiting example, a customer utilizing such an access device (150, 160 and/or 170) may have the option of using an XCIRA software library, which incorporates an API for pushing and retrieving data to/from the XCIRA servers.

Figure 2:
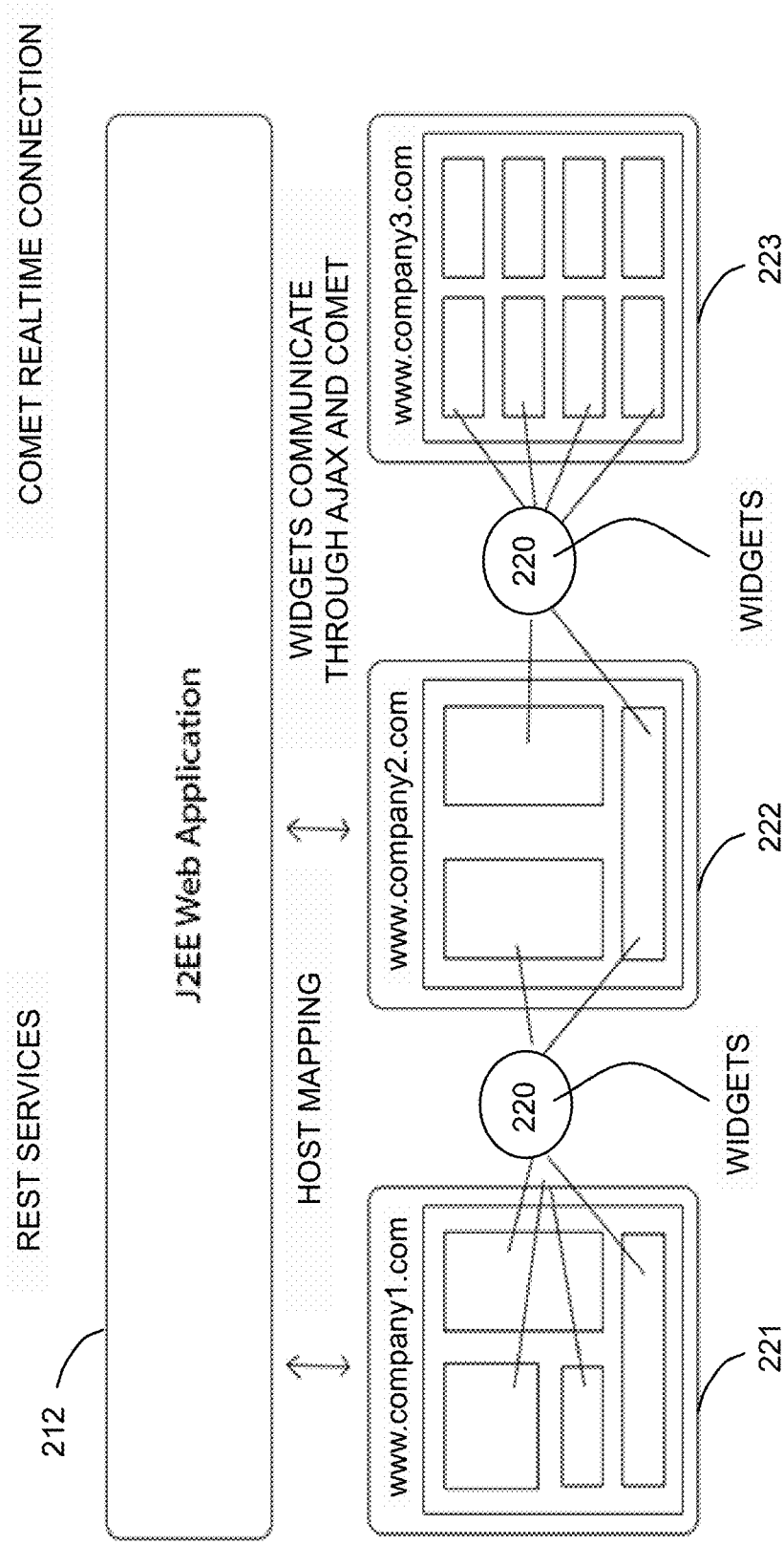
FIG. 2 is a conceptual block diagram illustrating the interface between an exemplary J2EE Web Application and an access device.

FIG. 2 is a conceptual block diagram illustrating the interface between an exemplary J2EE Web Application and an access device. As a non-limiting example, the J2EE web application 212 may reside on one of the J2EE Server Nodes 132A-132C within the J2EE Server Cluster 130 of FIG. 1. The J2EE web application 212 is illustrated as being accessible by a browser 150, mobile device 160 and/or server 170 as a few non-limiting examples. The J2EE Server Cluster provides a host mapping service. The different HTML pages will be served as landing pages based on the host found in the URL being accessed by the access device. The items presented on the HTML landing pages will have widgets embedded within them. The widgets, such as widgets 220 in FIG. 2, when actuated, will self-initialize and send out appropriate requests to the J2EE Server through AJAX requests and COMET. The webpages may be rich Internet applications that will give a user experience of a high-level of responsiveness because no page refreshing is required, unlike traditional webpages. With all or at least a substantial amount of the webpage being presented on the webpage as widgets, the customers can have a completely customizable platform even though they may be utilizing the same, shared backend system. For instance, each of the widgets can be put into any interface technology and any customized look and feel. In addition, the look and feel of the widgets can be augmented for any particular interface or instance. Thus, the widgets 220 are illustrated as being utilized in three different interfaces: Company 1 interface 221, Company 2 interface 222 and Company 3 interface 223. The widgets are shown as feeding into different components of different structured interfaces in each of the illustrated interfaces.

Figure 3:
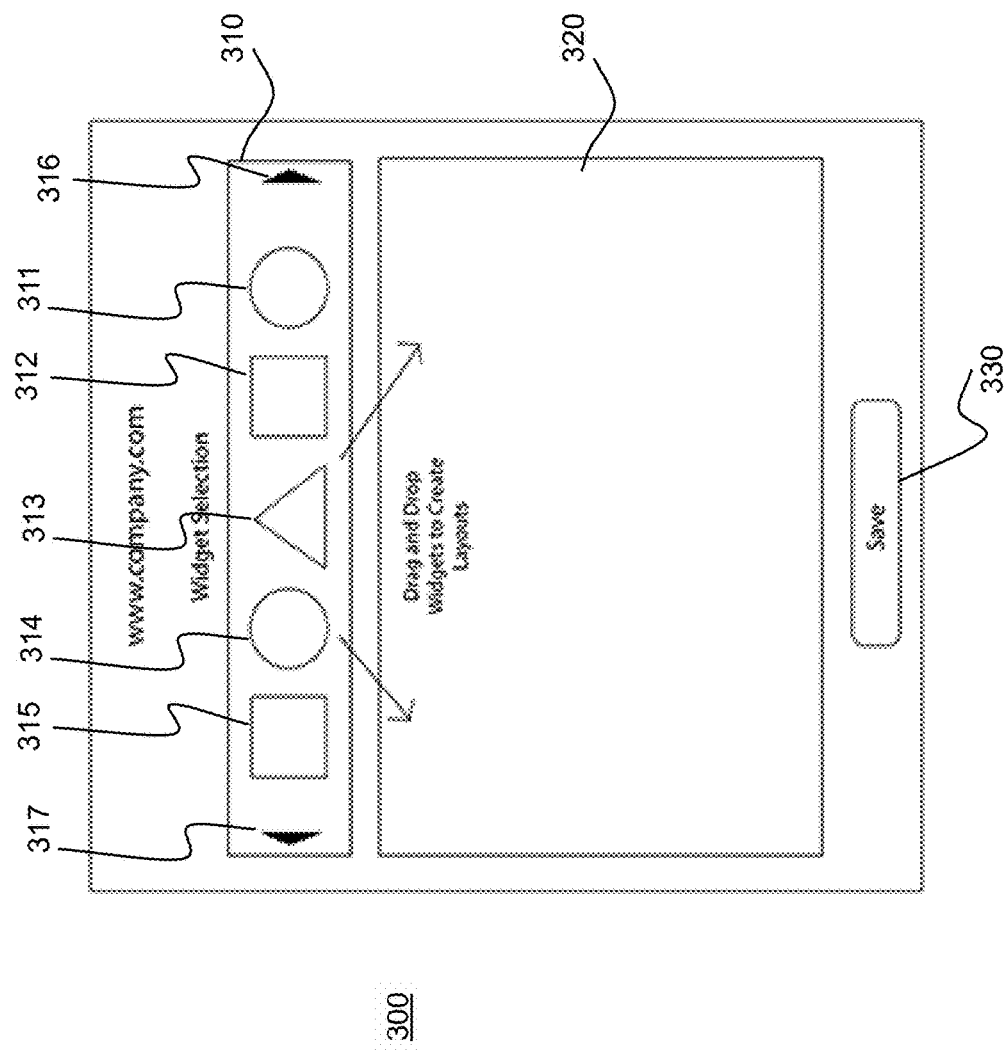
FIG. 3 is a block diagram of an exemplary interface for building an interface into an embodiment of the NGP.

FIG. 3 is a block diagram of an exemplary structure for building an interface into an embodiment of the NGP. Various embodiments of the NGB 100 may include tools that can be used to build interfaces into the system hosted on the NGB 100. These tools can leverage the previously constructed widgets in the creation of these interfaces. Further, the widgets may be customizable based on various parameters, including user preferences, user activity, seasons, etc., as well as cascading styling sheets CSS. Screen 300 is an exemplary interface-building screen enabling the custom design of an interface to an NGP using various widgets. The exemplary screen includes a widget selection bar 310 displaying widgets 311-315, along with scroll buttons 316 and 317 to give access to additional widgets not currently displayed. In addition, a layout area 320 is illustrated. A user can select various widgets from the widget bar 310 and drag them to desired locations within the layout area 320. During this process, the user may also select various other configuration options for the widget such as size, location, color, etc. Once the user has completed the design or a particular amount of the design, the layout can then be saved for use and/or future editing by actuation of the save button 330.

Exemplary embodiments of the NGP can serve as a platform for a wide variety of applications, such as an online-onsite auctioning system as a non-limiting example. As an example, XCIRA, INC. has developed and deployed such a system, which is referred to as ONLINE RINGMAN. The ONLINE RINGMAN, which is described in greater detail in U.S. Pat. No. 6,813,612, provides a system that integrates on-site auction activity with an online environment to allow both types of entities (onsite and online) to participate in the auction without experiencing prejudicial capabilities or having to be allocated preferential treatment. The ONLINE RINGMAN system includes a variety of features and capabilities that result in a powerful enterprise that has had a pioneering impact in the auctioning industry. The ONLINE RINGMAN system includes a clerk system that enables the control and operation of the auction. The auctioneer and/or the auctioneer's staff interface into the ONLINE RINGMAN system through the clerk system to control the movement of items through the auction and to interface with remote bidders. In addition, a marquee system is provided onsite as well as online to provide feedback to participants in the auction. A client system provides access to the auction participants and in a web-based system.

XCIRA, INC. also has developed an Intelligent Condition Evaluator (referred to as ICE), which is a robust condition reporting system that saves time and money while making condition reports more accurate and accessible. ICE allows inspectors and auditors to appraise the condition of assets using a handheld device that can attach photos, scan barcodes and take voice notes.

The ICE operates to inspect items and, among other things, generate an electronic inspection report. One aspect of the ICE is that the system has a repository of completed inspection reports and that the system mines the repository to determine correlations between fields of information in the completed inspection reports. Based upon the resulting field correlations, the system checks condition data as the inspector is recording it to determine and/or prevent erroneous data inputs.

Another aspect of the ICE is that it is scalable to inspect items from various different industries. Typically, the items from different industries are very unique such that a report template for an item from one industry is not appropriate for an item from another industry. The system is adapted to select the appropriate type of report template and provide the appropriate report template to a data collection device of an inspector. The system uses various criteria for determining the type of inspection report templates to provide to the data collection device. The ICE 304 may also include information obtained from asset reference guides and information from other participating asset disposition venues. Further details regarding various aspects of the ICE can be obtained by examining U.S. Pat. No. 8,739,059, which is incorporated into this application by reference.

XCIRA, INC. also has created a product referred to as ONLINE RINGLOTS. Using online timed auction concepts, the ONLINE RINGLOTS system provides a marketplace that can be tailored to a specific audience or market. The ONLINE RINGLOTS system can also be seamlessly integrated with the image and brand of the auction organization. Users register, search for desired items, place bids and complete transactions completely online. Among other things, the ONLINE RINGLOTS system provides searchable online catalogs, real-time bidding, single bid/maximum bid options, "Buy Now" capability, email and SMS notification of bidding status, anti-snipe function to extend bidding time when bidding occurs near the stop time, proxy bidding interface, bidder profile, including a favorites/watch list, bidder management functions (credit limit, email, paddle number, etc.), a customizable look that integrates the remarketer's graphics/branding (logos, CSS, headers, footers, customizable links, etc.), advanced reporting functions that provide the information necessary for success, two types of catalogs supported: perpetual (never ending; items rotate through the catalog independently) and event (all items end on the same day, simultaneously or in intervals), the ability to compare items for sale, and a customizable policy table which allows for bidding increment adjustment.

The afore-mentioned systems, as well as features and functionality thereof, present just a small picture of the capabilities and robustness that has been introduced to the market through the systems developed by XCIRA, INC.

One of the problems faced by XCIRA, as well as other multifaceted enterprise systems marketed by others in the auctioning and other industries, is a seamless integration of the various system components. For instance, just looking at the three XCIRA systems mentioned herein, the ONLINE RINGMAN, ICE and ONLINE RINGLOTS, while each are powerful products, a large amount of engineering effort and expense is involved in attempting to get these systems to talk with each other. However, the benefit that could be derived from a seamless integration of these systems would be a huge impact on the industry.

With the structure of the exemplary NGP, this integration is realized and the benefits are available for the industry. As an example, as a stand-alone system, when a new customer is to be added into the ONLINE RINGMAN system, considerable time and effort is required to set the system up, deploy the system and provide ongoing maintenance and support. Another issue is a lack of data persistence. For instance, once an auction or sale is completed in the ONLINE RINGMAN system, the information about the sale is then lost and is not accessible to other systems such as ICE or ONLINE RINGLOTS. Similarly, the ICE system is highly customized for various customers and as such, XCIRA is in a position to actually provide support to systems that are actually quite different.

The auctioning environments created and provided by XCIRA, INC., may include these elements as well as additional elements. With the NGP, these system elements no longer need to operate as stand-alone systems but rather, can be integrated into J2EE Server Nodes as individual web applications that all interface with and share the same data in the couchbase cluster and searched through use of the elasticsearch cluster. Further, rather than developing customized systems for various applications, the functionality of the ONLINE RINGMAN, ICE and OLINE RINGLOTS, or at least the control over these systems, can all be implemented into customizable widgets for creating custom interfaces. Thus, the deployment of a solution for a customer is streamlined and, the maintenance of the system is greatly reduced. Throughout the remainder of this document, reference will be made to the Integrated Auctioning Environment (IAE), which, in exemplary embodiments may include any of the above-listed XCIRA systems, as well as other systems, all integrated and implemented within an exemplary NGP.

Thus, it has been shown that the various embodiments of the NGP provide the ability for various components to be tied together through an easily modified and quickly deployable platform. The NGP allows components that are only peripherally related to be integrated into a cohesive solution. For highly complex components, only those aspects that may be beneficial or cooperative with other components of a fully integrated system can be easily culled out and made available to the system through defining and building the appropriate J2EE SN Web App that focuses only on those aspects. Thus, a component can be exercised by multiple different J2EE apps for different system solutions and some of the aspects in the solutions may overlap or, each solution may use unique aspects of the component. The capabilities of an IAE can be augmented, expanded and customized by including interfaces to each component that brings a desired functionality to the table. Thus, without impacting already deployed and operation components, other systems may incorporate and exercise aspects of those components in the creation a new, fully customized IAE.

Another aspect of various embodiments of the NGP is the leveraging of big data and the powerful capabilities obtained through data aggregation. With multiple systems and components interfacing to the couchbase cluster 110 and using it as a data repository, a wide range of information that typically would not be readily available for one component or system is now easily accessible. As a non-limiting example, the couchbase cluster may obtain sale data from one deployed system, asset data from another and bidder data from yet another. Some of these data components may actually be obtained and combined from multiple system sources providing redundancy, integrity validations and information augmentation. For instance, an online retail store may have one set of sale performance data for a class of items while an online auctioning system may have a completely different set of sale performance data for the same class of items. The data can include recent activity as well as historical data and even projections. As a non-limiting example, the data for an online store may include sales information such as location of item in store, amount of time on a shelf, number of patrons visiting the store, number and types of sales of items located proximate to the items of interest, types of purchasers, volume of sales, etc. On the other hand, an online auctioning system may include data such as the number of parties bidding on the items, number of actual auction participants, number of bids, aggressiveness of bids, etc.

Further, IAE systems can have access to user information of parties that may access or have accessed or utilized the IAE. In addition to typical profile information of registered users, the couchbase cluster may also include historical information related to various users such as bidding history, navigational information through various online components, mouse activity, perceived interest based on user mouse and navigation activity, prior purchases, bidding strategy (i.e, environments that result in a bidder taking an aggressive posture or a passive posture), current employment, current location, other real-time data related to the parties, etc.

The couchbase cluster may also include a wide variety of asset data such as quality, pricing trends, interest trends, related assets, comparison of other items typically purchased at the same time or close in time to the assets, etc.

Each of the J2EE SN Web Apps can thus exploit the data available in the couchbase cluster in any of a variety of manners to assist participants in making decisions, cross marketing products, creating artificial scarcity, catering to the present audience, etc.

Further, it should be appreciated that many other sources of information may also feed data into or operate as a source of data for the couchbase cluster. Such information may include world events, political events, seasonal changes, tending information or the like.

The wealth of information accumulated within the couchbase cluster is easily accessed and exploited through distributed indexing and searching of the data, such as through the elasticsearch cluster. Real time algorithms can continually parse the data and update categories of information about assets, trends, scarcity, etc. For instance, certain algorithms can be fired or triggered as the result of particular events, such as political events, social/economic events, disasters, weather, etc.

For instance, one non-limiting example of a specific event may be a particular auction participant being a runner up in an auctioning event. This could result in triggering an algorithm that searches for similar items that may be available across live and timed sales to present these options to the runner up. As another non-limiting example, a participant showing a level of interest in a lot of items may trigger an algorithm to search for suggested items to be presented to such participant that may be reluctant to purchase an entire lot but, has shown interest in particular subsets of items within the lot. Sources for these items could then be identified and suggested to the participant.

Various data mining algorithms may also be executed manually by parties or triggered automatically based on parameters, context rules, etc.

Powerful analytics can also be run to identify the who, what where, when and why of any particular transaction and such information can be utilized in increasing the probability of future sales and increased sales/purchase prices of particular items. For instance, a commonality in the who (types of entities typically purchasing a product) correlated with information about when those parties are likely to engage with the IAE could allow for increased sales by concentrating the availability of similar items during those periods of time.

Another advantage of the various embodiments of the NGP is that the IAE can be cultivated to meet the needs of the various classes of participants, such as bidders, sellers, consignors, enterprises, etc.

For instance, for individual type bidders, the IAE interfaces can be structured to highlight assets of interest based on the buyer's profile, specific asset criteria, platform usage, adaptive user monitoring etc. Information to assist buyers in making decisions can be provided through asset evaluations using historical/tending data that may be available from sellers of the product, data without the couchbase cluster as well as third party industry reports (i.e., consumer reports, etc.). Buyers may also gain access to market price determination information, asset details, retail demand, condition, availability, location, shipment times, etc. For enterprise buyers, further information such as resale/retail price determination, quantities available, service requirements, performance data, etc. can be provided. Further, information about the particular sellers, vendors and/or suppliers of a product can be analyzed and used to provide ratings of the same. All this as well as additional information can also easily be presented in tailored or custom reports for the buyers.

The IAE could also be set up to provide broad search inquiries from buyers in which the system can determine the best asset matches for buyers and provide opportunities for the buyers to attend live auctions, timed auctions or even direct them to direct sources of the products.

Figure 4:
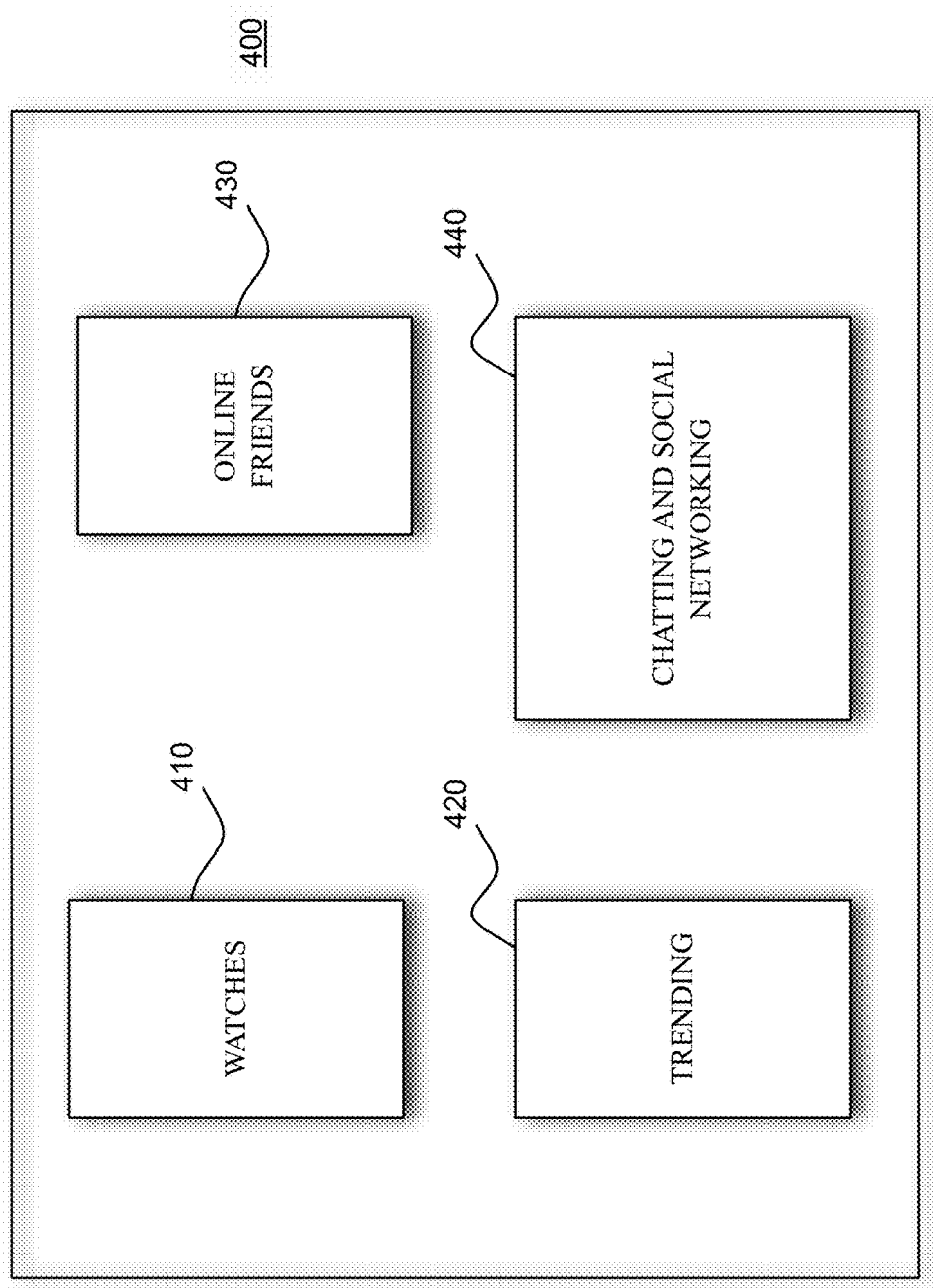
FIG. 4 is an exemplary screen showing a non-limiting example of a user-defined dashboard.

Similar to the tools available for creating customized interfaces to the IAE, bidders may also have the capability for creating customized dashboards with widgets to accommodate their needs or purchasing criteria. FIG. 4 is an exemplary screen showing a non-limiting example of a user-defined dashboard. The illustrated dashboard 400 can be created by a user selecting desired widgets and placing them on the user's interface dashboard. In the illustrated example, the user has enabled a watches window 410, trending 420, online friends status 430 and a social networking window 440. The watches window 410 may maintain a current status of the items that the user has expressed an interest in, placed a bid upon or simply tagged as an item that they want to track. Thus, the status, such as availability, current bid, bid time remaining, etc. can be easily displayed for the user. The trending window 420 can include trends regarding items that others are showing interest in as well as items that particular sellers are showing a special interest in their disposition, such as specials, discounts, etc.

A powerful element that is available through the various embodiments of the NGP is the opening of channels of communication, not just between buyers and sellers, but also between fellow buyers and/or friends. Further, having the ability to not only identify particular others that a buyer has a relationship with or is interested in watching or communicating with, such as through the online friends window 430, the NGP also enables the creation of a complete social networking platform. Such aspects not only allow buyers to share information about certain deals, item availability etc. but it also creates the ability for operators of the IAE to identify achievements, highlight wins, give recognition to others (i.e., Bidder Joe just smashed the chart by winning product A as a steal of a price!).

Other items that users may include in a dashboard could include calendars to show upcoming auction events, favored items, suggested items, friend or other interested party activity as non-limiting examples.

The dashboards may also be dynamic or static depending on various conditions. For instance, when an auction that a particular buyer is participating commences, the user's dashboard may automatically change to provide a more comprehensive focus on that auction. Thus, various layers of dashboards may be defined as well as triggering information for the activation of a particular dashboard as well as triggers that may result in algorithmic combinations or merging of dashboards.

It will also be appreciated that data can be accumulated and stored with regards to particular dashboards or interface designs. For instance, suggested user interfaces may be provided and the efficiency of such designs can be monitored for their effectiveness, usability, etc. Such information and experimentation can then be used in the creation of more efficient interface designs.

The various embodiments of the NGP can also be used to provide improvements in seller experiences. For instance, the accumulation of data within the couchbase cluster can be analyzed to provide recommended optimal disposition venues or combinations of venues that would increase the likelihood of product movement for a seller. Thus, a seller that would typically only push a particular item through one venue may be directed to also push the item through other venues in addition or in substitution. Further, recommendations can be made to sellers with regard to marketing optimization based on buyer interest for asset types and trending information. Even further, the accumulated data can be analyzed to even provide recommendation on optimized asset lineups, run orders, groupings, lineup premiums as well as a variety of other strategies that would typically only be available to sellers after spending large amounts of revenue to have studies performed based on limited information. However, such recommendations can be easily created based on actual data and great depths of data at limited or no cost to the seller.

Because the IAE can include many other system components other than just the seller/buyer interface component, the seller and buyer can actually track the entire asset status disposition cycle in IAEs that include the appropriate components, such as shipping components, manufacturing components, etc.

The IAE can also assist sellers in conversion management, such as identification of runner-up bidders and providing the ability to redirect such bidders or giving the seller a second bite at the apple with such bidders.

Similar to seller ratings, the IAE can analyze available data to not only identify buyer ratings but also to identify classes of buyers, shopping characteristics for such buyers and marketing strategies to best reach and draw buyers into a transactions.

Community Aspects

In view of the various aspects already presented herein, another aspect is also made available through the uniqueness of the various embodiments of the NGP and the provision of an IAE through the same. This aspect is the creation of communities of interest in which various buyers and sellers, as well as other entities can become emerged into, thereby creating a since of belonging. A wide variety of configurations are anticipated with regards to this aspect and, just a few non-limiting examples will be provided. As one example, the IAE can be set up to creating a buyers club in which like minded parties can join in to create a buying power that may not be available to the same parties operating as individuals. Thus, the IAE can create a virtual SAMS CLUB or COSTO type atmosphere in which buyers can join together, identify desired products and seek after those products as a community to benefit each of the parties in the buyers club. As another example, sellers may join together to create a community to attract certain classes of buyers and provide incentives to draw those buyers into an "elite" club relationship. Within such a community, the sellers can operate to create a competitive and/or comradery type atmosphere. With the infusion of the social media, the provision of educational opportunities, forums, presentations, etc., sellers can create communities that cater to and engage specific buyer markets.

These, as well as other types of communities can be used to provide auction updates, industry news, information from marketplace experts, information exchange, etc. For instance, member may be able to post and share content that is aggregated to social networks. Members can have individual profiles, selected friends or contacts, watch what such contacts bid on, receive reports regarding high bidders for the day, week, month, all time, etc. See reports of special achievements, provide feedback and tips to others, solicit advice, etc. Such communities may also provide for discussion forums, games to attract and retain attention. This community aspect also breeds an atmosphere of trust and brand that buyers and sellers can all obtain a benefit from.

It will thus be appreciated that the various embodiments of the NGP enable customization and design at various levels to create an overall IAE. For instance, widgets can be utilized in the design of specific interfaces to various components that are available for integration into the IAE. These specific interfaces may then also be used as widgets in and of themselves to create customized user interfaces for buyers, sellers or the like. Further, the customized user interfaces, the specific interfaces, as well as additional widgets can be used to create dashboards, communities, etc.

Examples of Operation

Live Sale. At the end of a live sell, one person typically walks away with a product and the seller, walks away with the satisfaction of closing a sell and earning revenue. However, right behind the winning bidder is a line of very willing buyers that ended up losing the opportunity to make a purchase and, a potential seller experiences lost revenue. In embodiments of the IAE, upon completion of a sale, the runner-ups can still potentially be turned into revenue generating customers. For example, the web application running on a J2EE Server Node can access the elasticsearch to identify similar or comparable items, services or products for which the runner-ups were competing. The elasticsearch accesses this data through the persistent couchbase server and provides information to the web application such as, alternative or identical products, vender or seller of such products, fixed prices for the products, etc. In addition, the winning party can be further leveraged by accessing the couchbase server through the elasticsearch server to identify additional products and/or services that the winning party may be interested in and that my compliment his or her purchase. For instance, a shipping company that has a partially completed shipment scheduled to the area from which the winning party is from could be presented for shipment of the winning parties purchase.

Multi-platform integration. The various embodiments of the NGP enable the integration of multiple platforms. For instance, and NGP that includes interface components to various item disposition platforms, such as an auction house, an online auction system, an online store (i.e., AMAZON), etc. Each such system could include a J2EE SN WEB APP interface within the J2EE server cluster 130 as illustrated in FIG. 1. In such a configuration, a seller or consignor may utilize an interface device to gain access to one such platform and enter data for a particular item to be sold. This data would thus be stored within and accessible from the couchbase cluster 110. If the item is selected to be included on multiple platforms, other platforms may access and present the same item as available to its viewing audience. As an example, assume that item A is entered into a live auction environment in this manner. Item A may then be listed as available on the other platforms as well. If item A goes onto the auction floor, the other platforms can be updated with regards to the status of item A. Further, users accessing any of the platforms may take actions intended to close a sell on item A and, as such actions take place, each of the platforms are dynamically updated. This is enabled by each of the platforms including J2EE SN WEB APPs that are hosted within the J2EE Server Cluster 130 and sharing the same data residing in the couchbase cluster 110. Thus, if the items is sold on one platform, each of the other platforms instantly indicate that the item has been sold.

Cross-selling across multiple platforms and users. Taking the previous example one step further, a valuable set of information available in the couchbase cluster 110 is information about various users that may be accessing any one of a variety of platforms. The overall NGB having access to the couchbase cluster, or a specific J2EE SN WEB APP designed to promote the movement of items can gain access to the user base, identify when a user gains access to one of a variety of platforms and then, use this information to not only increase the size of the audience available for the disposition of an item but, to also use this information to entice or motivate the various parties. For instance, suppose user A is showing a level of interest in item A, such as bidding, looking at condition reports, setting up a watch, etc. Subsequently, user B come online on the same or a different platform. They system may have knowledge that user B has a particular interest in item A based on past actions and thus, may then prompt user B to let the user know that user A has been showing some interest in an item that user B may want. In addition, the system can leverage the presence of user B by information user A that user B has been successful on a certain number of previous auctions for similar items and that user A should bid aggressively or he or she may have a higher risk of losing the item.

Figure 5:
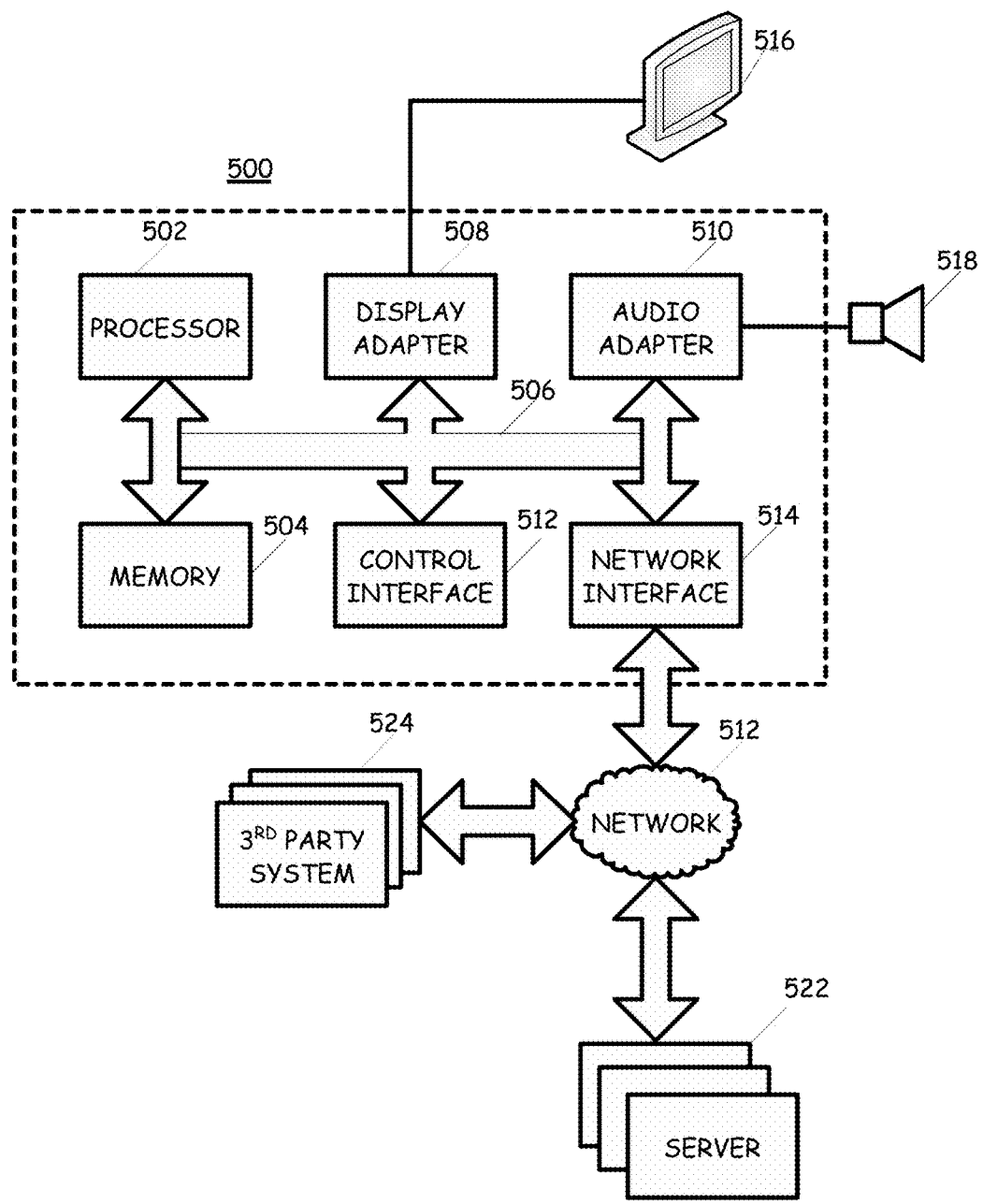
FIG. 5 is a functional block diagram of the components of an exemplary embodiment of the system or sub-system operating as a controller or processor 500 that could be used in various embodiments of the disclosure for controlling aspects of the various embodiments.

FIG. 5 is a functional block diagram of the components of an exemplary embodiment of the system or sub-system operating as a controller or processor 500 that could be used in various embodiments of the disclosure for controlling aspects of the various embodiments. It will be appreciated that not all of the components illustrated in FIG. 5 are required in all embodiments of the activity monitor but each of the components are presented and described in conjunction with FIG. 5 to provide a complete and overall understanding of the components. Further, in some embodiments, additional components not illustrated may be added for particular interfaces and functionality. The controller can include a general computing platform 500 illustrated as including a processor/memory device 502/504 that may be integrated with each other or communicatively connected over a bus or similar interface 506. The processor 502 can be a variety of processor types including microprocessors, micro-controllers, programmable arrays, custom IC's, etc., and may also include single or multiple processors with or without accelerators or the like. The memory element of 504 may include a variety of structures, including but not limited to RAM, ROM, magnetic media, optical media, bubble memory, FLASH memory, EPROM, EEPROM, etc. The processor 502, or other components in the controller may also provide components such as a real-time clock, analog to digital convertors, digital to analog convertors, etc. The processor 502 also interfaces to a variety of elements including a control interface 512, a display adapter 508, an audio adapter 510, and network/device interface 514. The control interface 512 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or another computer or processing device or the like. The display adapter 508 can be used to drive a variety of user interface elements 516, such as display devices including an LED display, LCD display, one or more LEDs or other display devices. The audio adapter 510 interfaces to and drives another alert element 518, such as a speaker or speaker system, buzzer, bell, etc. The network/interface 514 may interface to a network 520 which may be any type of network including, but not limited to, the Internet, a global network, a wide area network, a local area network, a wired network, a wireless network, or any other network type including hybrids. Through the network 520, or even directly, the controller 500 can interface to other devices or computing platforms such as one or more servers 522 and/or third party systems 524. A battery or power source provides power for the controller 500.

Various aspects, features and embodiment of the NGP and its applicability within an IAE have thus been presented by way of example. Within the IAE, it will be appreciated that a common goal among all participants is to reach a conversion—the closing of a transaction. The various embodiments of the NGP operate to achieve conversion optimization. In general, this is accomplished at least in part through the NGP integrating technology systems, accumulating and sharing data, and performing analytics of the data in real-time to provide real-time feedback and process adjustments. Thus, as a non-limiting example, within an auctioning environment, data from various auctioning systems as well as other ancillary systems operating in conjunction therewith or simply accessible by (as previously presented) can be analyzed in real-time within the auctioning environment and real-time adjustments can be identified and implemented to optimize conversion. The combination of system and component integration along with the access to and analytics of the shared data operate to create an instantaneous and dynamic environment for providing optimized conversions.

Figure 6:
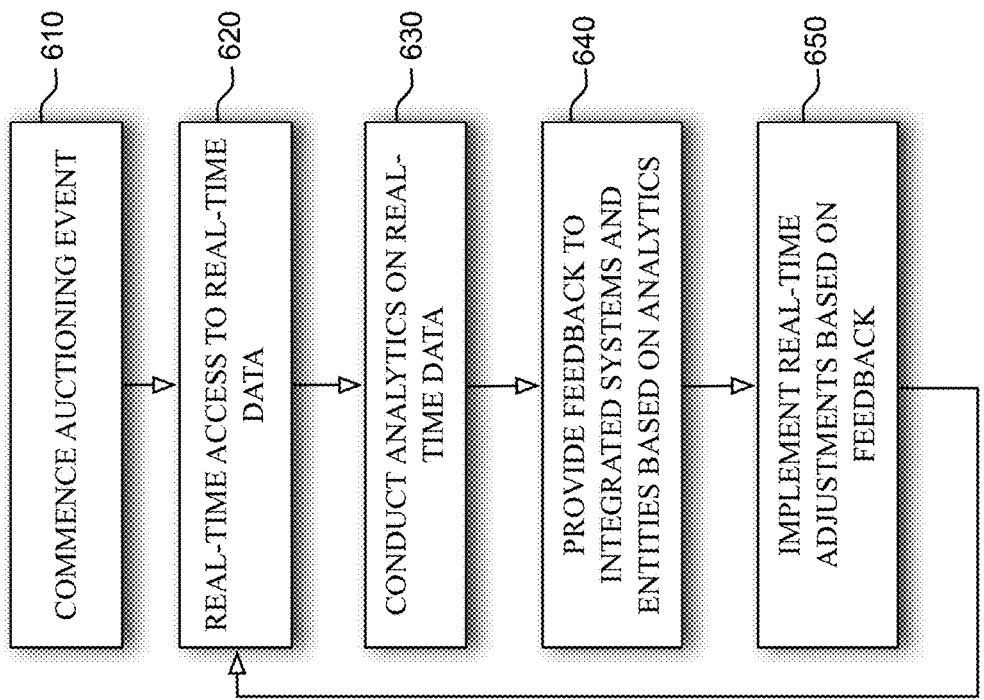
FIG. 6 is a flow diagram illustrating the dynamic operation of an IAE based on embodiments of the NGP.

FIG. 6 is a flow diagram illustrating the dynamic operation of an IAE based on embodiments of the NGP. Although the presented flow diagram is illustrated as operating based on an auctioning event, it should be appreciated that this is simply a non-limiting example and the principles of operation could be applied in a variety of settings. Initially, an auctioning event is commenced 610. The commencement of the auctioning event can initiated blindly or based on a current knowledge base. This means that a particular auctioning event, such as offering a item up for auction, can initially be constructed without any knowledge or historical analysis available within the auctioning environment or, the parameters of the auctioning event may be constructed by taking the historical information into consideration. In either case, once the auctioning even commences, the IAE can instantaneously begin accessing real-time data related to a variety of aspects of the auctioning event 620. As non-limiting examples, the IAE can identify the entities that are joining into the auctioning event (who is participating, what is their bidding styles, what wins and loses the entities have), identify entities that are watching the auctioning event (who is watching, what is their bidding styles, what wins and loses the entities have, what items have they historically watched and not bid for and what items they have bid for, etc.), identify the bidding and entity interest (such as the industry the entity is associated with, previous purchases, inventory status, etc.), identify characteristics of the selling entity (current inventory, conversion necessities, other products offered by seller, etc.) identify similar or related items that are being presented in other auctioning events, access data related to the item that is being auctioned (such as reliability, product pricing, product availability, etc.). As the IAE access the real-time data in real-time, the IAE can also instantaneously begin the performance of analyzing the real-time data 630. The amount, type and extent of the analytics generated during this process are unlimited and the IAE can be continuously enhanced or expanded by adding, augmenting, changing and deleting various rules, heuristics and algorithms employed in generating analytics. Analytics can focus on bidding entities, selling entities, industries, products, etc., as well as combinations of such focuses.

As analytics are generated, feedback related to or based on the analytics can be provided to the various components and/or entities within the IAE 640. In response to the reception of the feedback, the various components and/or entities can then implement real-time adjustments 650. If a conversion is obtained, processing can end but, if a conversion has not yet been obtained, processing continues with gathering more real-time data. It should be appreciated that the illustrated processes do not necessarily operate in succession but rather may be operating concurrently and communicating with each other in real-time.

Those skilled in the art will appreciate that an unlimited number of examples could be provided but, to illustrate the operation of the IAE, a few non-limiting examples are provided.

Example 1

The real-time data may identify a particular entity is watching the auction.

An analysis of historical data related to that entity may reveal that the particular entity tends to focus on name brand items. The IAE can then operate to obtain information to compare and contrast the present item with similar name brand items. This information can be presented to the particular entity enabling the entity to see how the current item compares with name brand equivalents.

Example 2

An analysis of the entities participating in the auctioning event may reveal that a subset of the entities may have common characteristics, such as common product needs. Such needs can also be analyzed in view of other products available from the selling entity or other entities. In response to this information, the selling entity may augment the auction by optionally bundling the item being auctioned with one or more additional items. For instance, the winning entity may be offered the opportunity to purchase the one or more additional items at a particular price.

Example 3

The real-time information related to multiple auctions may indicate an increased interest in the market place for products related to a specific industry. For instance, the winning bid levels, intensity of auctions and number of participants for auctions related to soccer paraphernalia may indicate a trend showing an increased favor in the market. Analysis of this information along with real-time information regarding current events may indicate that this heightened interest occurs typically when a particular soccer team is performing well. As a result, when that particular team is prevailing during a match, the IAE may provide notice to vendors and manufactures of such paraphernalia that they may want to increase promotional activity related to those goods.

Thus, the NGP based IAE operates to translate live feedback from user reactions, environmental changes, as well as many other parametrical changes to help cultivate the environment to reach a conversion.

Figure 7:
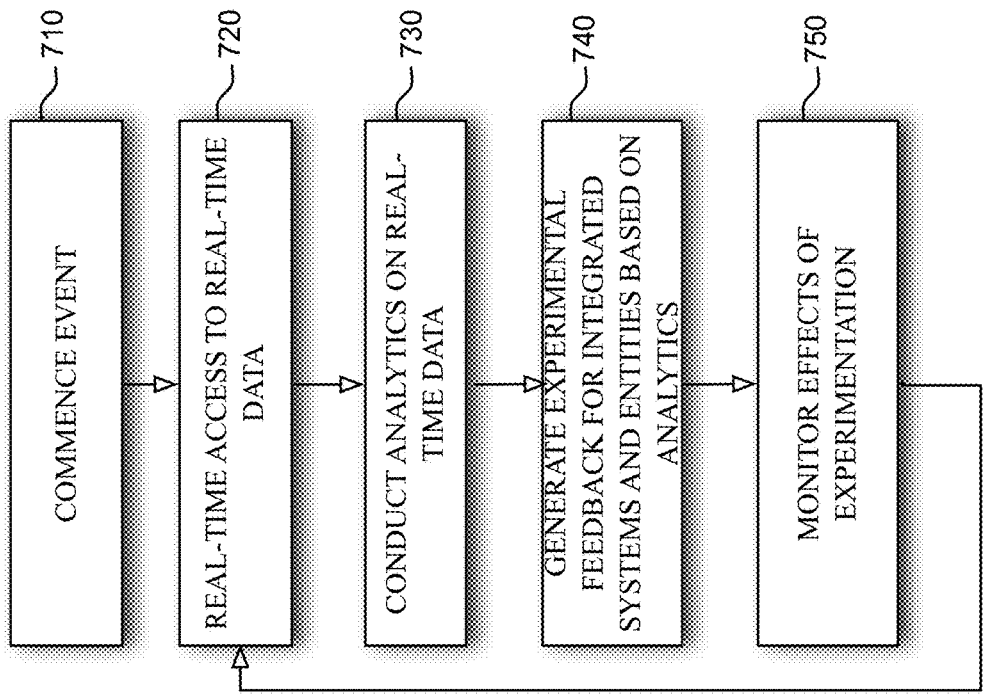
FIG. 7 is a flow diagram illustrating injection of experimentation into the operation of an IAE based on embodiments of the NGP.

FIG. 7 is a flow diagram illustrating injection of experimentation into the operation of an IAE based on embodiments of the NGP. Initially, an event related to one or more components integrated into the IAE commences 710. During the even, real-time data is accessed in real time 720 and the real-time data is analyzed 730. Based on the analytics, or independent of any analytics, experimental feedback or information may be injected into one or more components of the IAE and/or provided to one or more participating entities 740. The experimental feedback may be any of a variety of information and is generally provided to observe the overall effect that the information has upon the IAE and the various components and/or entities. Thus, upon injection of the experimental feedback, the results within the IAE are monitored 750. The monitoring process may include conducting further access to data and analysis by looping with process 720 etc.

Again, a wide variety of examples can be presented for this aspect of the embodiment of the NGP but only a few, non-limiting illustrative examples are provided.

Example 1

During an auctioning event, the participants may be analyzed based on their bidding aggressiveness during the auction and contrasted with historical information to identify probabilities of winning the auction for the various entities. This information may then be provided to participants by augmenting the user interface of the participant's bidding systems to include the probabilities. The bidding characteristics of the participating entities can then be monitored to determine if the information motivates or demotivates the entities.

Example 2

During an event, the presentation of information related to the event can be modified, such as enhancing various attributes and the effect of such changes in the presentation can be monitored. For instance, in an auctioning event, particular pictures of the an item being auction may be changed to see what type of a picture has the most positive or negative effect on bidding aggressiveness.

Thus, the NGP based IAE operates to provide experimental feedback to determine the effect on entity reactions and event progressions in response to such feedback.

It has thus been shown that the NGP provides a strong integration and connectivity in an instantaneous environment. The NGP embodiments address environment mandates related to an instantaneous environment including security issues, stability, a level of trust, flexibility, predictability and schema-less aspects. The data warehousing tenets available in the various embodiments of the NGP enable instantaneous capabilities such as business analytics, trending analysis, contextual and actionable reporting, enhanced self-service reporting and key performance indicators (KPIs). Without a succinct and relevant set of KPIs, organizations are often burdened with non-actionable data in which stakeholders often become frustrated and the analytics program stalls for extended periods of time. You need to be able to get the right data in front of the right people, and that data needs to be actionable. A true KPI is tied directly to an objective, rated or graded, time sensitive and embraced by the organization. The various embodiments of the NGP enable this.

The various embodiments of the NGP provide instantaneous content management through the deployment of software design kits (SDK) and widget based design functionality. Further, the NGP embodiments provide ease of changes and tweaking for customer needs and support. In essence, the NGP enables a one-size-fits-one modeling solution with agility in the time-to-market and the ability to embrace innovative customizations.

As a platform for an IAE, a balance can be obtained between satisfaction of goals and optimizing conversions. The data warehousing, data sharing, flexibility in design and deployment, along with the interconnectivity and feedback capabilities of an NGP based IAE allow for leveraging of experimentation, analysis of the psychology of the process, branding, seamless communication, exploitation of marketing and sales into the IAE, etc. to strike a balance between the goals of all participants while optimizing the ability to achieve conversions.

The various embodiments of the NGP enable adaptive modeling of various enterprise systems, including an IAE. The overall IAE acquires an intimate knowledge of the components available to and operating within the IAE. Further, with the cross-correlation between participating components as well as interested components, combinatorial or multidimensional offerings can more readily be exploited. Experimental modeling is available to create scenarios in which neuroeconomic/behavioral reactions can be triggered, monitored, modeled, analyzed and leveraged for optimizing the process.

Further, the instantaneous nature of an NGP based IAE enhances the experience of all parties by providing "smart" features to the bidders, sellers and auction house, providing community-based fulfillment and give the participants an "anywhere" and "everywhere" access to the system.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A computer-implemented system for providing a dynamically adjusting auctioning environment by integrating a plurality of networked components into a single platform, the system comprising:
   a machine readable data store for receiving and maintaining real-time data from one or more sources;
   a server that is communicatively coupled to the data store and comprising a search engine, the server configured to:
      receive requests from one or more requesting elements, wherein the one or more requesting elements comprise at least one of browsers, mobile devices and servers;
      construct searching criteria based on the request;
      query the data store based on the searching criteria;
      receive query results; and
      provide the query results to the one or more requesting elements;
   an application interface communicatively coupled to the search engine and the data store, the application interface including a plurality of network accessible applications with each of the plurality of network accessible applications interfacing to one or more networked components and, one or more of the network accessible applications configured to provide a system function based at least in part on the query results from the search engine and the interfaced networked components; and one or more of the network accessible applications including an interface to one or more user devices configured for invoking and interacting with the system function associated with the networked application, wherein the plurality of network accessible applications comprises:

an auction application configured to run under a first set of operational parameters and that is configured to integrate an on-site auction activity with an online auctioning environment wherein on-site and online entities can participate in the on-site auction in accordance with the first set of operational parameters;

an evaluation application that is configured to receive condition reports for items to be auctioned by providing industry appropriate report templates to handheld inspection devices and receiving the inspection results; and an online timed auction application that includes searchable catalogs, real-time bidding, buy now functionality and SMS notification of bidding status;

wherein the data received from each of the one or more network accessible applications is available to each of the other network accessible applications through the data store and, the auction application is configured to modify the first set of operational parameters in real-time based on the data received through the data store from the one or more network accessible applications in order to enable the on-site and online entities to participate in the on-site auction in accordance with the modified set of operational parameters.

2. The computer-implemented system of claim 1, wherein each of the networked applications is stored on one or more of a plurality of J2EE Server Nodes.

3. The computer-implemented system of claim 2, wherein each of the J2EE server nodes exists within a J2EE Server Cluster.

4. The computer-implemented system of claim 2, further comprising a load balancer communicatively coupled to the plurality of network accessible applications, the networked components and the user devices, the load balancer being configured to receive a system function request for a particular network accessible application, identifying which network accessible application instance to invoke based on the current load for the J2EE Server nodes.

5. The computer-implemented system of claim 1, wherein the query results are data pertaining to the auction and include one or more of the following group of data types, identity of the participants, the bidding sequencing, the products of consideration, the seller characteristics, data provided from other systems involved in the auctioning event or systems related to other aspects of the auctioning event such as social networking systems providing information about participants, business bureau information pertaining to the sellers, market and reliability information pertaining to the products, and political and social-economic current events, the auction application analyzes the received query results based on real-time data and instantaneously alters the operation of the auction by using a second set of operational parameters.

6. The computer-implemented system of claim 1, wherein the auction application analyzes the received query results based on real-time data and provides feedback to one or more of the plurality of networked components for altering the operation of the one of more of the plurality of networked components.

7. The computer-implemented system of claim 1, wherein the auction application receives experimental parameter adjustments and provides the parameter adjustments to one or more of the plurality of networked components for altering the operation of one or more of the plurality of networked components, receives real-time query results and analyzes the real-time query results to determine the effect of the experimental parameter adjustments.

8. The computer-implemented system of claim 1, wherein the data store is a couchbase cluster.

9. The computer-implemented system of claim 1, wherein the search engine is an elasticsearch cluster.

10. The computer-implemented system of claim 9, wherein the data store is a couchbase cluster.

11. A computer-implemented method for dynamically altering the operation of an auctioning event, the method comprising the actions of:

a network accessible auctioning application commencing an auctioning event based on a first set of operational parameters;

the auctioning application conducting a real-time analysis of real-time data obtained from a communicatively coupled data store, the real-time data pertaining to the auctioning event and including one or more of the following: identity of the participants, the bidding sequencing, the products of consideration, the seller characteristics, data provided from other systems involved in the auctioning event or systems related to other aspects of the auctioning event such as social networking systems providing information about participants, business bureau information pertaining to the sellers, market and reliability information pertaining to the products, and political and social-economic current events;

a network accessible evaluation application communicatively coupled to the data store and that is configured to receive condition reports for items to be auctioned by providing industry appropriate report templates to handheld inspection devices and receiving the inspection results and stores the inspection results in the data store; and a network accessible online timed auction application communicatively coupled to the data store and that includes searchable catalogs, real-time bidding, buy now functionality and SMS notification of bidding status and stores auction results and statistics in the data store;

wherein the data received from each of the network accessible applications is available to each of the other network accessible applications through the data store; and the auctioning application altering the operational parameters of the auctioning event based on the data received from the other network accessible applications in real-time from the data store and continuing the auctioning event based on the altered operational parameters.

12. The computer-implemented method of claim 11, wherein the action of generating feedback further comprises generating feedback based at least in part on the real-time analysis.

13. The computer-implemented method of claim 11, wherein the action of generating feedback further comprises generating feedback to experimentally alter the operational parameters of the auctioning event independent of the real-time analysis and further, monitoring the changes in the real-time analysis to identify the effect of the experimentally altered operational parameters.

14. The computer-implemented method of claim 11, wherein the data store is a couchbase cluster that receives data from one or more of a plurality of networked components and the action of conducting a real-time analysis of real-time data further comprises generating one or more queries into the couchbase cluster to obtain relevant real-time data.

15. The computer-implemented method of claim 14, wherein the action of generating one or more queries into the couchbase cluster further comprises sending a request to an elasticsearch cluster that is communicatively coupled to the couchbase cluster.

16. The computer-implemented method of claim 11, wherein the auctioning module is a network accessible application operating within a J2EE server cluster and, further comprising the actions of:
    providing an auction interface to one or more participating devices; and
    delivering auctioning event update information through the auction interface to one or more participating devices.

17. A computer-implemented method for dynamically altering the operation of an auctioning event, the method comprising the actions of:
    an auctioning module commencing an auctioning event based on a first set of operational parameters;
    the auctioning module continuously conducting a real-time analysis of real-time data obtained from a communicatively coupled data store, the real-time data pertaining to the auctioning event and being updated as the auctioning event progresses and including one or more of the following: identity of the participants, the bidding sequencing, the products of consideration, the seller characteristics, data provided from other systems involved in the auctioning event or systems related to other aspects of the auctioning event such as social networking systems providing information about participants, business bureau information pertaining to the sellers, market and reliability information pertaining to the products, and political and social-economic current events; and
    the auctioning module continuously generating feedback to one or more of a plurality networked components communicatively coupled to the auctioning module, the feedback comprising information that alters the operational parameters of the ongoing auctioning event as well as information to alter the operation of one or more of the plurality of networked components, which comprise:
        a network accessible evaluation application configured to receive condition reports for items to be auctioned by providing industry appropriate report templates to handheld inspection devices and receiving the inspection results; and
    a network accessible online timed auction application that includes searchable catalogs, real-time bidding, buy now functionality and SMS notification of bidding status.

18. The computer-implemented method of claim 17, wherein the action of generating feedback further comprises applying a set of rules to generate feedback increase the likelihood of a conversion by identifying runner-up bidders and providing the ability to redirect such bidders to other similar items.

19. The computer-implemented method of claim 17, wherein the action of generating feedback further comprises feedback that is directed to result in an effect on the auctioning event by experimentally altering the operational parameters of the auction and further comprising the action of analyzing the effects caused by the feedback induced altering.

* * * * *